(12) United States Patent
Melbouci et al.

(10) Patent No.: US 7,851,416 B2
(45) Date of Patent: Dec. 14, 2010

(54) OXIDIZED GUAR FOR OILFIELD SERVICING FLUIDS

(75) Inventors: Mohand Melbouci, Wilmington, DE (US); Tuyen T. Nguyen, Newark, DE (US); Teng-Shau Young, Wilmington, DE (US)

(73) Assignee: Hercules Incorporated, Wilmington, DE (US)

( * ) Notice: Subject to any disclaimer, the term of this patent is extended or adjusted under 35 U.S.C. 154(b) by 656 days.

(21) Appl. No.: 11/804,544

(22) Filed: May 18, 2007

(65) Prior Publication Data

US 2007/0275862 A1 Nov. 29, 2007

Related U.S. Application Data

(60) Provisional application No. 60/801,657, filed on May 19, 2006.

(51) Int. Cl.
*C09K 8/68* (2006.01)

(52) U.S. Cl. .................. 507/217; 507/211; 507/219; 507/240; 507/265; 507/269; 507/276; 166/305.1; 166/308.1

(58) Field of Classification Search ................. None
See application file for complete search history.

(56) References Cited

U.S. PATENT DOCUMENTS

| | | | |
|---|---|---|---|
| 3,297,604 A * | 1/1967 | Germino ................ 525/54.2 |
| 4,693,728 A * | 9/1987 | Clare et al. ................ 8/561 |
| 4,859,208 A * | 8/1989 | Clare et al. ................ 8/557 |
| 5,554,745 A * | 9/1996 | Chiu et al. ................ 536/52 |
| 5,562,160 A | 10/1996 | Brannon et al. |
| 6,022,717 A * | 2/2000 | Brady et al. ............ 435/101 |
| 6,124,124 A * | 9/2000 | Brady et al. ............ 435/190 |
| 6,179,962 B1 * | 1/2001 | Brady et al. .......... 162/164.1 |
| 6,433,161 B1 * | 8/2002 | Cheng et al. ............ 536/114 |
| 6,858,255 B2 * | 2/2005 | Deckers et al. .......... 427/333 |
| 6,884,884 B2 | 4/2005 | Magallanes et al. |
| 6,981,552 B2 * | 1/2006 | Reddy et al. ............ 166/294 |
| 2002/0010101 A1 | 1/2002 | Pakulsi |
| 2002/0076769 A1 * | 6/2002 | Brady et al. ............ 435/101 |
| 2002/0102661 A1 * | 8/2002 | Businket al. ........... 435/101 |
| 2003/0054963 A1 | 3/2003 | Chowdhary et al. |

* cited by examiner

*Primary Examiner*—John J Figueroa
(74) *Attorney, Agent, or Firm*—Robert O'Flynn O'Brien; Joanne Mary Fobare Rossi

(57) ABSTRACT

An oilfield servicing fluid composition containing an aldehyde guar produced by enzymatic oxidation of a non-derivatized, straight guar or of a guar derivative. The enzyme used to oxidize the guar to the aldehyde guar is galactose oxidase, which may be combined with catalase or catalase and peroxidase. The aldehyde guar is useful as an effective gelling agent for oilfield servicing fluids such as hydraulic fracturing fluids and stimulation fluids.

13 Claims, 3 Drawing Sheets

Comparative Hydration Rate at 40 pptg in 2% KCl Water
77 °F - Fann 35 @ 511 s$^{-1}$

OXIDIZED GUAR FOR OILFIELD SERVICING FLUIDS

RELATED APPLICATIONS

This application claims the benefit of U.S. Provisional Application Ser. No. 60/801,657 filed on May 19, 2006 which is incorporated by reference in its entirety.

FIELD OF THE INVENTION

This invention relates to a composition and use application of oxidized guar in oilfield servicing fluids. More specifically, this invention relates to the use of enzyme-treated guar as an effective gelling agent for hydraulic fracturing and stimulation fluids.

BACKGROUND OF INVENTION

Drilling an oil or gas well involves several steps prior and after a well is put into production. Primary oil-recovery operations include drilling the well, cementing the casing to the formation and completing the well prior to oil or gas production. Workover operations may be necessary during remedial work in producing wells, usually as an attempt to enhance or prolong the economic life of a well. When flow rate of the oil or gas is diminished, the reservoir of the well may be treated in some manner to increase the flow of oil or gas into the wellbore. This operation is called secondary recovery, known as fracturing/stimulation operations.

Fracturing/stimulation operations are performed either by acid wash or hydraulic fracturing. When the reservoir is depleted, enhanced oil recovery operations may be needed to increase the well's production rate. This operation is called tertiary recovery, and involves injection of fluids into the formation surrounding the production well to increase the flow rate of the formation fluid into the wellbore.

In order to accomplish the above mentioned operations, drilling fluids are used as an integral element of drilling programs for primary oil recovery. They are especially designed to perform numerous functions that are critical to the success of drilling operations. In order to perform these functions, drilling fluids should possess particular properties with regard to their rheology, density, and filtration control.

Guar and guar derivatives are widely used in fluids for use in oil-well fracturing and stimulation applications. They are particularly used in hydraulic fracturing fluids, to provide filtration control and rheology to suspend proppant, which are sized particles mixed with the hydraulic fracturing fluid and are used to hold fractures open after a hydraulic fracturing treatment, and carry the proppant into the fractured formation. They are used in combination with several other chemicals, and particularly crosslinkers to provide optimum crosslinked gels, necessary to suspend the proppant.

The ultimate viscosity of guar is heavily dependent on the quality of guar splits. While a few changes in the process may contribute to enhance the ultimate viscosity by a small amount, a main contributor remains the quality of the raw material. Over the past few years, a guar (Variety 365, a variety of guar seeds grown in irrigated regions such as Haryana in India) has been commercialized, and has been used to produce "high viscosity" guars. Such a high quality of guar is now imported to the USA, and all the majors pumping companies have adopted its use.

To produce such a high viscosity guar, the use of the newly engineered guar splits is not sufficient enough to fully extract the optimum viscosity potential out of the splits. Adjustment of process parameters is required. Laboratory experiments did highlight the importance of the initial wetting and tempering conditions to produce enhanced ultimate guar viscosity. However, many of the process changes would require a significant capital investment to consistently produce the desired high viscosity guar.

The product of the oxidation of aqueous solutions of guar gum and other galactose bearing polysaccharides using galactose oxidase enzyme was disclosed in U.S. Pat. No. 3,297,604, incorporated herein by reference in its entirety. The aldehyde bearing oxidized products are separated by precipitation from the aqueous solutions used for the enzyme reactions. U.S. Pat. No. 3,297,604 disclosed the use of the oxidized products in the manufacture of paper. The aldehyde bearing oxidized products were disclosed to be also suitable for use to crosslink polyamino polymers, polyhydroxy polymers, and proteins.

U.S. Pat. No. 5,554,745, incorporated herein by reference in its entirety, discloses (1) the preparation of cationic galactose containing polysaccharides and (2) the enzymatic oxidation in aqueous solution of the cationic galactose containing polysaccharides with galactose oxidase. The oxidized cationic polysaccharides are disclosed to improve the strength characteristics of paper.

U.S. Pat. No. 6,022,717, incorporated herein by reference in its entirety, discloses a process for the oxidation of the oxidizable galactose type of alcohol in oxidizable galactose type of alcohol configuration containing polymer, such as guar, with galactose oxidase in the presence of oxidation promoting chemicals. This patent does not disclose the use of such oxidized polymers in oilfield servicing fluids.

U.S. Pat. No. 6,124,124, incorporated herein by reference in its entirety, discloses a composition of an oxidizable galactose type of alcohol configuration containing polymer, such as guar, which is in solid state and galactose oxidase. Application of such oxidized polymers in the papermaking process results in superior paper strength characteristics. This patent does not disclose the use of such oxidized polymers in oilfield servicing fluids.

U.S. Pat. No. 6,179,962, incorporated herein by reference in its entirety, discloses a process for making paper having improved strength characteristics by adding to the pulp water-soluble and/or water-dispersible cationic polymer and oxidized galactose type of alcohol configuration containing polymer, such as guar. This patent does not disclose use of such oxidized polymer in oilfield servicing fluids.

U.S. Patent 2003/0054963 discloses a method of treating a subterranean formation using a well-treated fluid where the gelling agent includes a fast hydrating, high-viscosity guar powder. This patent does not disclose any galactose oxidase treatment to enhance the viscosity of the guar.

U.S. Pat. No. 6,884,884 discloses a method for depolymerizing galactomannan and derivatives thereof with a liquid cleaving agent. This patent describes the cleaving agents as a chemical molecule that non-specifically cleaves ether bonds between mannoses in the galactomannan backbone which includes acids such as hydrogen halides in the form of a liquid (acid hydrolysis) and oxidizing reagents (oxidative degradation) but does not include enzymes. Among the objects of this patent is to provide a method for making a composition comprising galactomannan having a certain molecular weight, polydispersity index and viscosity, which is useful, e.g., in treating or making a fracture in a subterranean formation.

High viscosity is an important aspect to the crosslinked gels. To increase efficiency over commercially available guars, there is still a need for even higher viscosity polymers that would allow the use of reduced polymer loading to minimize the level of residue after break, hence increasing the return permeability.

SUMMARY OF THE INVENTION

The present invention is directed to an aldehyde guar produced from enzymatically treated guar composition for use as an efficient gelling agent in oilfield servicing fluids such as fracturing and stimulation fluids. The treatment of the guar with a very small amount of galactose oxidase results in an aldehyde guar that has a significantly higher viscosity.

High viscosity grade guars are desired in order to provide sufficient carrying capacity and water retention at reduced loading, to minimize the residue content, left by the guar after break, in the fractures, and therefore to maximize the return.

U.S. Pat. Nos. 6,022,717; 6,124,124; 6,179,962, all of which have been incorporated by reference in their entireties, disclose the use of galactose oxidase in producing an oxidized guar. It has been found that treatment of guar with a small amount of galactose oxidase enhances the viscosity of guar and guar which is useful in oil field servicing fluids.

The present invention relates to an oilfield servicing fluid composition containing an aldehyde guar that is obtained from a guar containing a galactose which is oxidized by reacting with galactose oxidase to provide an aldehyde group in the $C_6$ position of the galactose. The aldehyde guar is then combined with a continuous phase, such as water, oil or gas to produce the oilfield servicing fluid composition.

The present invention also relates to a process for producing an oilfield servicing fluid composition which comprises the steps of obtaining a guar containing a galactose and hydrating this guar. The guar is then contacted with a galactose oxidase and permitted to react to produce an aldehyde guar. The aldehyde guar is then combined with a continuous phase, such as water, oil or gas to produce the oilfield servicing fluid.

DETAILED DESCRIPTION OF THE INVENTION

Figure 1:
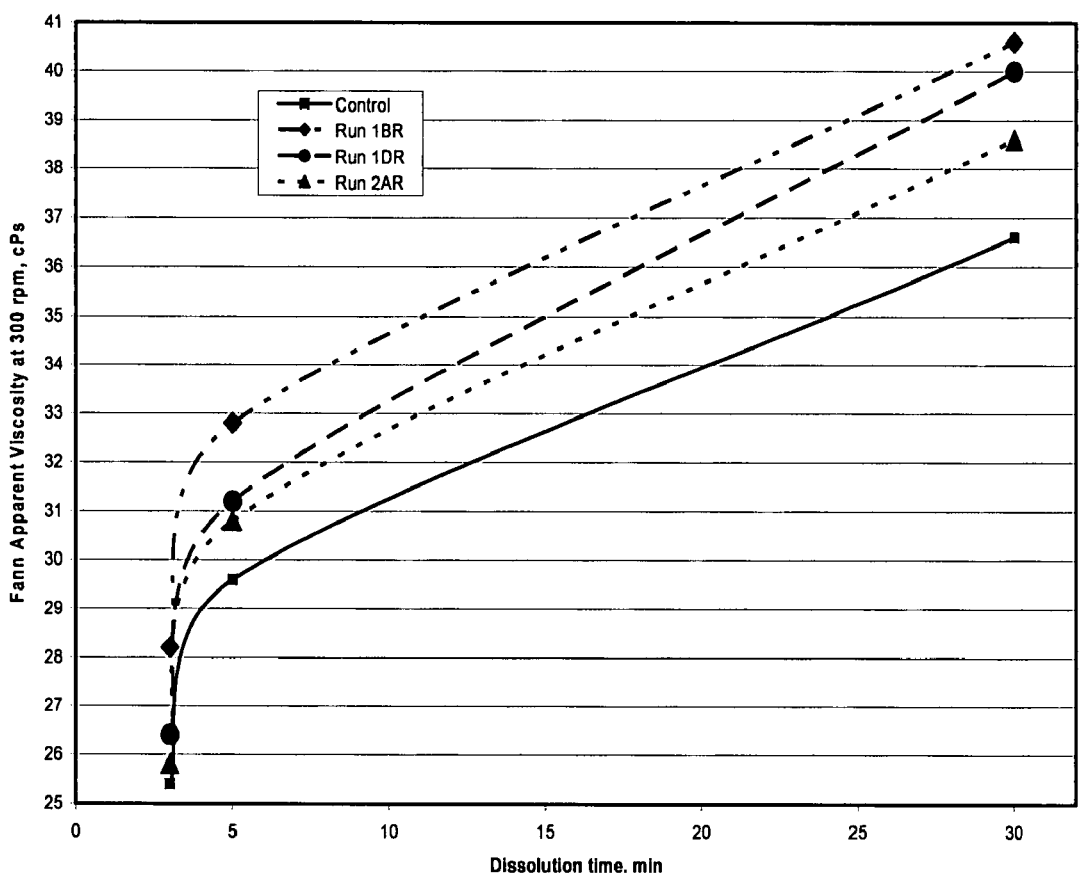
FIG. 1 is graph of the hydration rate 40 pounds per thousand gallons (pptg) guar in 2% KCl brine for aldehyde guar compositions produced through enzymatic treatment as well as a control guar composition.

In accordance with the present invention, it has been surprisingly found that treating guar, preferably guar splits, during a tempering, or hydration, step with a small amount of galactose oxidase resulting in an aldehyde guar with a higher viscosity which is useful in oilfield servicing fluids, such as for example, fracturing and stimulation fluids. Several treatments were performed at various galactose oxidase levels (0.5 to 25 International Units per gram (IU/g) of guar). This invention provides means of increasing the guar ultimate viscosity using standard guar splits. This invention improves the viscosity of straight guar, and ultimately guar derivatives.

Guar is in a class of polysaccharides useful in preparing aldehydic derivatives and may be any of the galactose containing polysaccharides and particularly naturally occurring galactose containing polysaccharides. These are the polysaccharides containing the galactose configuration at the $C_6$ position and which can be oxidized at the $C_6$—OH position to form an aldehyde group. Guar is a heteropolysaccharide composed principally of long chains of mannose units and single unit side chains of galactose.

Oxidation of guar can be carried out chemically or preferably enzymatically by galactose oxidase. Preferably neutral or anionic or amphoteric guar that has been oxidized by galactose oxidase, additionally catalase may be used in conjunction with the galactose oxidase. Galactose oxidase can be applied to solid, slurry, or solution forms of guar products: e.g., shredded, powder, flake, and pellet forms of neutral, anionic or amphoteric guar. Derivatized guar, such as those containing hydroxypropyl groups can also be used.

Guar contains a galactose configuration at the $C_4$ position and as illustrated below. This galactose configuration or unit is oxidized with the enzyme galactose oxidase to form an aldehyde group at a specific position of the unit, i.e., the $C_6$—OH group.

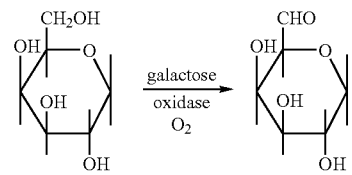

The oxidation of the guar for use in the present invention may preferably take place in a solid state where the enzyme, galactose oxidase, is contacted with the guar while the guar is in a particulate form. The phrase "solid state" as used in the present application means that the polymer is in particulate form, i.e., is composed of discrete particles, which are preferably visible to the naked eye. The particulate forms of guar of use in the present invention may be selected from the group consisting of splits, flaked splits and flour.

The galactose oxidase may be in the form of a solution and sprayed onto the surfaces of guar in particulate form. Alternatively, the galactose oxidase may be dry blended with guar in particulate form.

The guar may be a non-derivatized or straight guar. Alternatively, the guar may be a derivatized guar selected from the group consisting of hydroxypropyl guar (HPG), carboxymethyl guar (CMG), carboxymethyl hydroxypropyl guar (CM-HPG), hydroxyethyl guar (HEG), carboxymethyl guar (CM-HEG), hydrophobically-modified guar (HMG), hydrophobically-modified carboxymethyl guar (HMCMG) and hydrophobically-modified hydroxyethyl guar (HM-HEG).

As taught in U.S. Pat. No. 6,022,717, galactose oxidase (EC 1.1.3.9) is a copper oxidase which converts the oxidizable galactose in the guar to its corresponding aldehyde group (thus producing oxidized galactose) by reducing oxygen to hydrogen peroxide. The copper must be in the correct oxidation state (Cu.sup.2+) to perform this oxidation and the copper ion must be retained in the galactose oxidase. If galactose oxidase solution is stored anaerobically with any oxidizable substrate, it can become inactive. Galactose oxidase can be reactivated by oxidizing the copper with reagents such as potassium ferricyanide. Another way to oxidize the copper in galactose oxidase would be by electrochemical oxidation.

As taught in U.S. Pat. No. 6,022,717, galactose oxidase can be obtained by any suitable manner, e.g., by fermenting various wild type and cloned fungi but is usually obtained from *Fusarium* spp (NRRL 2903). Cultures may also be obtained from the American Type Culture Collection under *Dactylium dendroides* ATCC 46032, and they are successfully fermented under the procedure of Tressel and Kosman. Methods in Enzymology, Vol 89 (1982), pg 163-172. The gene for active forms of the enzyme have been expressed in *E. coli* and *Aspergillus* and this development may lead to more stable and active forms of the enzyme as well as much greater production levels. The gene or improved forms will also be expressed in plants which can be harvested to give higher levels of enzyme without the threat of enzyme destruction by proteases in a fermentation broth.

The enzyme can also be expressed by other organisms including: *Gibberella fujikoroi, Fusarium graminearum*, and *Bettraniella porticensis*.

The oxidation by galactose oxidase is often carried out in the presence of the catalase. The amount of catalase can be at least about 1 International Unit (IU) of catalase/International Unit (IU) of galactose oxidase. Catalase can be present in an amount of up to about 10,000 IU of catalase/unit of galactose oxidase. The catalase destroys hydrogen peroxide formed from the galactose oxidase reaction. Additionally, and amount of a peroxidase may also be added to galactose oxidase which also removes hydrogen peroxide formed from the galactose oxidase reaction.

The aldehyde content of the aldehyde guar may be expressed in terms of dextrose equivalent (D.E.) which is the reducing value of the formed aldehyde derivative. The aldehyde guar will preferably have a reducing value or aldehyde content of at least about 5 D.E. and more preferably at least 10 D.E. The maximum D.E. value or aldehyde content in the case of guar which typically has a galactose/mannose ratio of about 38/62, the D.E. may approach about 40.

A concentration in the order of 1.5-2.5 IU/g of guar is sufficient to achieve a 10-15% viscosity increase in the aldehyde guar produced in the galactose oxidase treatment of guar when compared to a corresponding untreated guar.

The aldehyde guars of the present invention are of particular utility in drilling fluids used in the oil and gas industry.

Drilling fluids are classified on the basis of their principal constituent (continuous phase). The continuous phase may be water, oil, or gas. The resulting drilling fluids are called water-based mud, oil-based mud, or foam mud, respectively. The aldehyde guars of the present invention are particularly useful as rheological modifiers for water-based muds and foam muds.

As well as containing the aldehyde guars of the present invention, the aqueous continuous phase of drilling fluid may also include alkalies, salts and surfactants, organic polymers (CMC/PAC, xanthan gum, HEC, starches and other synthetics polymers that may be required for dispersing or shale inhibition properties), droplets of emulsified oil, biocides, corrosion inhibitors and various insoluble substances, such as barite, clay and cuttings in suspension. Several mud "types" or "systems" are recognized and described in the literature such as, but not limited to: spud muds, dispersed/deflocculated muds, lime muds, gypsum muds, salt water muds, non-dispersed polymer muds, inhibitive potassium muds, cationic muds and mixed metal hydroxide (MMH) muds.

Completion and workover fluids are specialized fluids used during well completion operations and remedial workover procedures. The types of completion and workover fluids can be categorized into clear solids-free brines, polymer viscosified brines with bridging/weighting agents, and other fluids including oil base, water base, converted muds, foam, etc. One selection criteria for an appropriate completion or workover fluid is its density. Clear, solids free brines are the most commonly used fluids and are viscosified with polymers (CMC/PAC, xanthan gum, non-enzymatic treated guar and guar derivatives, and HEC) and may incorporate solids that can be dissolved later, such as acid soluble calcium carbonate or sized sodium chloride salt, for increased density or bridging purposes. A typical completion/workover fluid contains, but not limited to, a base brine, thickener, fluid loss reducer, shale inhibitor, corrosion inhibitor, scale inhibitor, oxygen scavenger, bridging agent, thermal stabilizer, biocide and polymer breaker. The aldehyde guars of the present invention are particularly useful in controlling the rheology and thickening of completion and workover fluids in general and clear solids free brines in particular.

The base brines for use in the oilfield servicing fluids of the present invention may contain salt wherein the salt is selected from the group consisting of potassium chloride, sodium chloride, calcium chloride, potassium formate, potassium carbonate, calcium bromide, tetramethyl ammonium chloride, and any mixture thereof. Potassium chloride is a preferred salt in the present application.

The following Examples serve to provide specific illustrations of the practice of this invention, but they are not intended in any way to limit the scope of this invention. All parts and percentages in this specification being by weight unless otherwise indicated.

Example 1

Experiments were carried out on a lab scale by diluting galactose oxidase in an amount of tempering water, then adding the tempering water containing the galactose oxidase onto guar splits and mixing the hydrating splits for 10-15 minutes. An amount of guar splits were tempered without the additional galactose oxidase for comparative purposes. The temperature of the tempering water was varied from 75° C. to 96° C. (167° F. to 205° F.). The guar splits moisture was kept around 50%. After the guar splits were tempered or hydrated, the wet guar splits were then flaked. Then, 1% solutions were prepared with the guar flakes (high shear mixing was required to ensure full dissolution). All solutions were mixed under the same conditions. After measuring the guar solutions Brookfield viscosity using a #4 spindle at 30 rpm at room temperature (approximately 21° C.), the solutions were then diluted with 4% KCl brine, corresponding to an average of 40 pptg loading in 2% KCl brine, and then measured the linear gel viscosity (Fann 300 rpm reading). The data measured for this Example were recorded in Table 1. The objective was to compare the treated guar to the control sample.

Data in the Table 1 indicate that galactose oxidase treated guar samples yield appreciable viscosity increase over the control. Samples of runs 1 to 3, made under same tempering conditions as the control (75° C. (167° F.) temperature, about 50% splits moisture and 15 minutes soaking time), provide a gain of viscosity over the control varying from about 48% to 83% Brookfield viscosity (1% solution), corresponding to about 12% to 16% Fann viscosity at 40 pptg loading for the samples treated with 1.5-IU/g and 2.5-IU/g galactose oxidase, respectively. Reducing down the soaking time to 10 minutes (runs 4 to 6), while maintaining the splits moisture and tempering temperature, did affect the solution viscosity. However, the treated guar samples do still provide higher viscosity (10-13% Fann viscosity) than the control, even at very low enzyme treatment (run 4 with 0.5 IU/g). Increasing the tempering temperature to 96° C. (205° F.) (run 7), while maintaining the splits moisture and low soaking time (10 minutes), significantly improved the viscosity. The gain in viscosity was about 67% Brookfield viscosity corresponding to about 17% increase in Fann viscosity.

These initial results show that the enzyme treatment of guar splits significantly enhances the viscosity of the guar with a minimum expenditure.

ity). The average viscosity gain was 7.6% as compared to the control sample taken prior to the enzymes treatment. The most successful results were registered after the first hour of treatment (run 1BR with 10.9% higher viscosity) and third hour of treatment (run 1DR with 9.3%). The variations in the viscosity observed during this trial could probably be attributed to the variability of the enzyme feeding rate.

TABLE 1

Properties of enzymatically treated laboratory guar samples

| | Galactose Oxidase, (IU/g guar) | Splits Charge, (grams) | Water Charge, (grams) | Splits Moisture, (%) | Soak Time, (min) | Temp., (° C.) | Moisture (%) | 1% Brkf μ (cPs) | Fann μ in 2% KCl* (cPs) |
|---|---|---|---|---|---|---|---|---|---|
| Control | 0 | 400 | 336.00 | 49.6 | 15 | 75° C. | 22.6 | 5180 | 46.5 |
| Run 1 | 1.5 | 400 | 335.07 | 50.4 | 15 | 75° C. | 15.8 | 7650 | 52.0 |
| Run 2 | 2.5 | 400 | 334.45 | 50.0 | 15 | 75° C. | 21.9 | 9490 | 54.0 |
| Run 3 | 25 | 400 | 320.50 | 49.9 | 15 | 75° C. | 24.2 | 8350 | 53.0 |
| Run 4 | 0.5 | 400 | 335.69 | 50.6 | 10 | 75° C. | 22.6 | 7480 | 52.5 |
| Run 5 | 1.5 | 400 | 335.07 | 50.6 | 10 | 75° C. | 24.4 | 7680 | 51.0 |
| Run 6 | 2.5 | 400 | 334.45 | 50.4 | 10 | 75° C. | 23.7 | 7780 | 51.5 |
| Run 7 | 1.5 | 400 | 335.07 | 50.2 | 10 | 96° C. | 17.5 | 8650 | 54.5 |

*0.5% guar (40 pptg) in 2% KCl solutions

Example 2

The laboratory results of Example 1 were validated in on a plant scale. The target was to produce a fast hydrating high viscosity guar by treatment of guar splits with galactose oxidize enzymes on a larger scale. Based on previous laboratory work, the initial level of enzyme treatment was set at 2.5 IU/g of guar to achieve a minimum target Fann linear gel viscosity (300 rpm Dial Reading, at 25° C.) at 40 pptg loading in 2% KCl brine. For this trial, 34 litres of galactose oxidize enzyme solution were used.

The enzyme solution was continuously metered into the premix pot, simultaneously with tempering water and splits. The wetted splits were then hydrated for about 15 minutes before the flaking process. During the trial, several tempering conditions were investigated. The splits moisture was varied from 45% to 51% and the water temperature from 36° to 44° C. (96° to 111° F.). Guar flour samples were taken on hourly basis and the Fann viscosity was measured in order to follow the effect of the treatment at 40 pptg loading in a 2% KCl brine.

Data in Table 2 indicate a gain in viscosity varying from 5.5% to 10.9% during the trial (30 minutes linear gel viscos- It is surprising that ultimate linear gel viscosities of 39-40 cPs could be achieved with such a low water tempering temperature. It was expected that low temperatures would not promote optimum hydration of the splits.

By combining low tempering temperature with splits moisture of about 50%, it was observed that the splits were too wet, and visibly not sufficiently hydrated. Reducing the moisture down to about 46-47% during the trial did not help much to improve the hydration/wetting of the splits. As a consequence, there was a little drop of the ultimate linear gel viscosity down to about 38 cPs (run 2AR).

Gradually increasing the water temperature to 41° C.-44° C. (105-111° F.), while maintaining the low moisture (~46%), did definitely improve the hydration of the splits and, consequently, the resulting ultimate linear gel viscosity went up slightly to about 39 cPs (runs 2BR & 2CR).

During this trial, it was validated that the enzyme treatment does definitely show significant benefits to boost the viscosity of the guar flour.

TABLE 2

Properties of enzymatically treated plant guar samples

| | Tempering conditions | | | | Hydration rate at 40 pptg in 2% KCl | | | | Particle size Distribution, mesh | | |
|---|---|---|---|---|---|---|---|---|---|---|---|
| | Galactose Oxidase, (IU/g guar) | Splits Moisture, (%) | Soak Time, (min) | Temp. (° C.) | Moisture (%) | 2 min (cPs) | 3 min (cPs) | 5 min (cPs) | 30 min (cPs) | <100 (%) | <200 (%) | <325 (%) |
| Control | — | 51 | 15 | 36 | 7.7 | 22.4 | 25.4 | 29.6 | 36.6 | 100 | 97 | 56 |
| Run 1BR | 2.5 | 51 | 15 | 36 | 6.3 | 25 | 28.2 | 32.8 | 40.6 | 100 | 95 | 55 |
| Run 1CR | 2.5 | 51 | 15 | 36 | 6.4 | 24.2 | 26.4 | 31.4 | 39 | 100 | 95 | 56 |
| Run 1DR | 2.5 | 51 | 15 | 36 | 7.3 | 22.8 | 26.4 | 31.2 | 40 | 100 | 95 | 56 |
| Run 2AR | 2.5 | 47 | 15 | 36 | 5.7 | 22.2 | 25.8 | 30.8 | 38.6 | 100 | 96 | 60 |
| Run 2BR | 2.5 | 46 | 15 | 41 | 5.3 | 22.4 | 25.6 | 30.4 | 39 | 100 | 97 | 58 |
| Run 2CR | 2.5 | 46 | 15 | 44 | 5 | 23 | 26.8 | 31.6 | 39.2 | 100 | 97 | 56 |
| | | | | | | | | ≧36 | ≧41 | ≧99 | ≧95 | ≧55 |

FIG. 1 depicts the hydration rate/linear gel viscosity development profile of the treated guar samples determined at a dosage of 40 pptg (pound per thousands gallon) in 2% KCl brine. The viscosity development profile was recorded at 511 sec$^{-1}$ shear rate (300 rpm) and 25° C. (77° F.) using Fann 35 viscometer, over a period of 30 minutes. The viscosity profile clearly demonstrates the higher viscosity developed by the enzymatically treated guar samples over the control.

Example 3

Additional experiments were conducted in the plant using a batch process. Based on previous scaled-up experiments in Example 2 using a continuous process, initial level of enzymes treatment was set at 2.5 IU/g of guar. Later on, the efficiency of the galactose oxidase (G.O.) was increased by activating the G.O. with catalase and peroxidise. The activation of G.O. was achieved by mixing the G.O. with 8.53% catalase and 1.07% peroxidase (amount based on G.O. weight). The aldehyde guar samples were prepared by adding 0.68 kg (1.5 lb) G.O. or activated G.O. into 226.8 kg (500 lbs) wet splits (55-57% moisture) and reacted for 30 minutes at temperature varying from 27° C. to 35° C. (80° F. to 95° F.). The splits were then flaked, dried and ground. The resulting guar flour was tested for linear gel viscosity as well as for crosslinked viscosity.

The hydration rate/linear gel development of the standard guar and aldehyde guar samples was determined at a dosage of 40 pptg (pound per thousands gallon) in a 2% KCl brine. The viscosity development profile was recorded at 511 sec$^{-1}$ shear rate and 25° C. (77° F.) using Fann 35 viscometer, over a period of 30 minutes.

Figure 2:
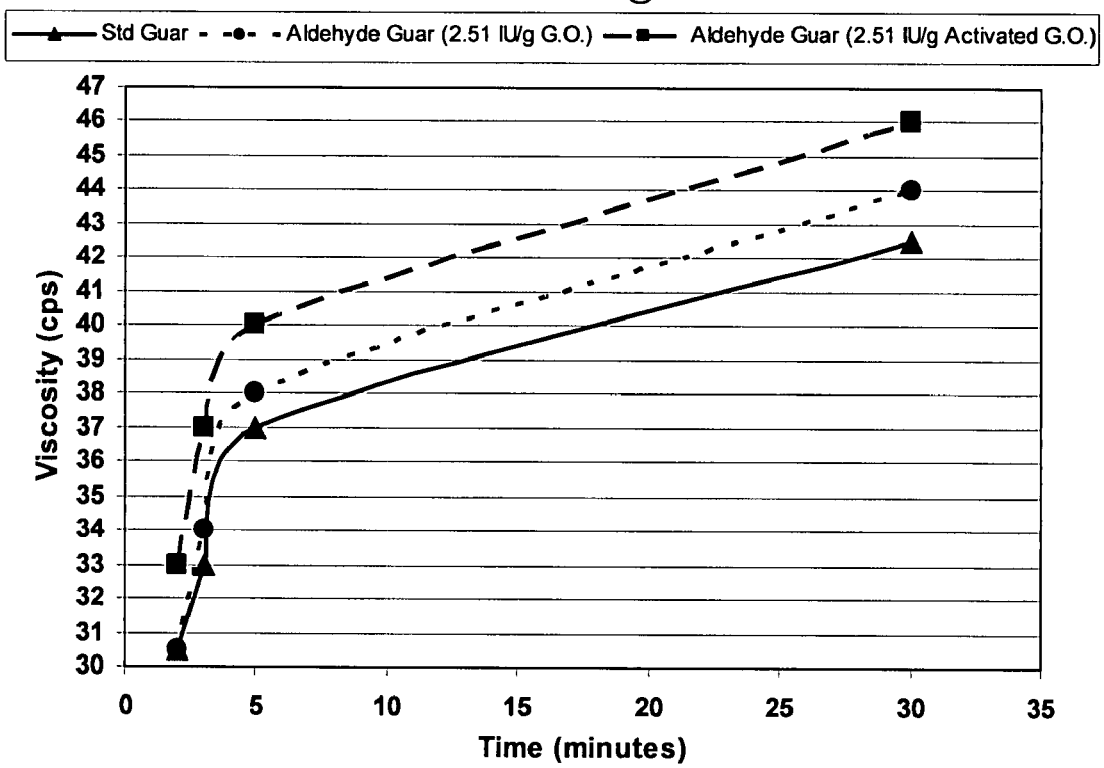
FIG. 2 is a graph of the hydration rate 40 pounds per thousand gallons (pptg) guar in 2% KCl brine for aldehyde guar compositions produced through enzymatic treatment, both activated and unactivated, as well as a control guar composition.

FIG. 2 illustrates the high ultimate viscosity achieved after 30 minutes with the aldehyde guar samples. As can be seen in FIG. 2. higher viscosity was achieved with guar treated with galactose oxidase activated with catalase and peroxidase (activated G.O.) when compared to guar treated with galactose oxidase without the catalase and peroxidase enzymes as well as standard (untreated) guar.

Figure 3:
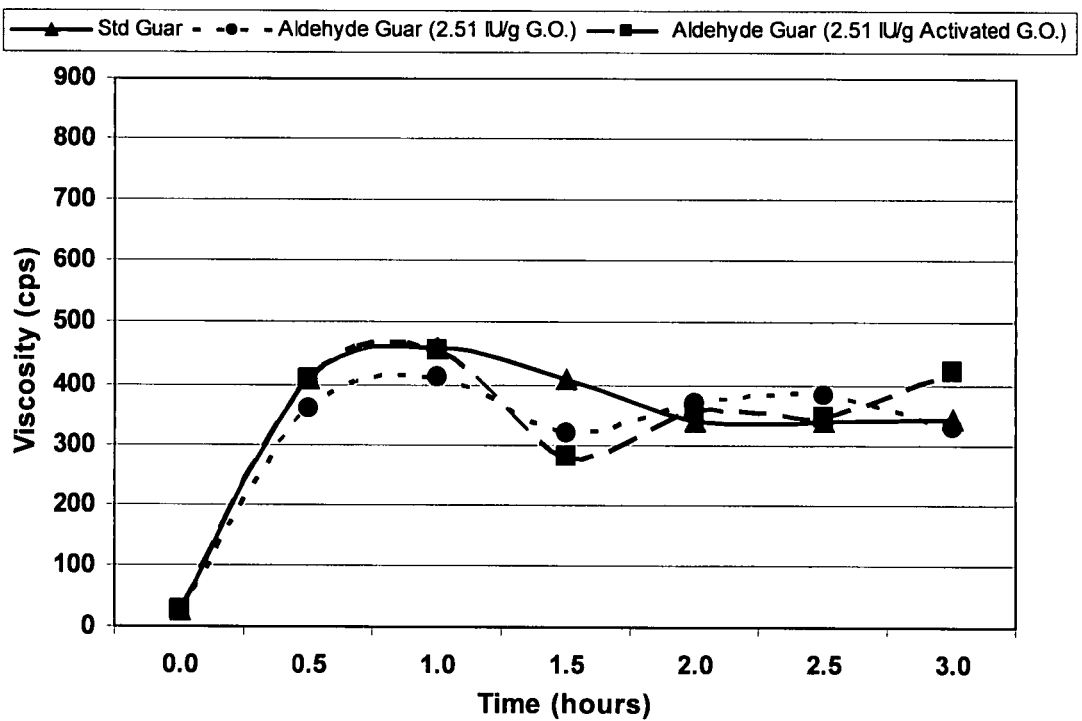
FIG. 3 is a graph of the comparative crosslinked gel viscosity over time for aldehyde guar compositions produced through enzymatic treatment, both activated and unactivated, as well as a control guar composition.

FIG. 3 illustrates a crosslinked gel viscosity development of in a typical fracturing fluid containing 20 pptg (pounds per thousand gallon) guar or aldehyde guar, 10 pptg (gallon per thousand gallon) $Na_2S_2O_3$, 5 gptg Boric acid mixture, in 1 gptg Tetra Methyl Ammonium Chloride (TMAC) solution at pH 10.5. The test was run on Fann 50 viscometer at various shear rates and 93° C. (200° F.) over a period of 3 hours. The data (at 106 s$^{-1}$) shows that the crosslinked gel viscosity of the fracturing fluid remains relatively stable over the testing time period without any apparent break of the gel structure. The aldehyde guar samples behave just as well as standard guar samples, indicating that while the linear gel viscosity was increased with the aldehyde guar samples produced through enzyme treatment, the crosslinked gel viscosity of these guars was not affected.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed:

1. An oilfield servicing fluid composition comprising:
    a) an aldehyde guar obtained from a guar containing a galactose which is oxidized by reacting with galactose oxidase; and
    b) a continuous phase,
wherein the continuous phase comprises water and a salt, wherein the salt is selected from the group consisting of potassium chloride, sodium chloride, calcium chloride, potassium formate, potassium carbonate, calcium bromide, tetramethyl ammonium chloride, and any mixture thereof, and wherein the guar containing a galactose is a guar derivative selected from the group consisting of hydroxypropyl guar (HPG), carboxymethyl guar (CMG), carboxymethyl hydroxypropyl guar (CMHPG), hydroxyethyl guar (HEG), carboxymethyl guar (CMHEG), hydrophobically-modified guar (HMG), hydrophobically-modified carboxymethyl guar (HMCMG) and hydrophobically-modified hydroxyethyl guar (HMHEG).

2. The oilfield servicing fluid composition of claim 1, wherein the oilfield servicing fluid composition is a fracturing/stimulation fluid.

3. The oilfield servicing fluid composition of claim 1, wherein the salt comprises potassium chloride.

4. The oilfield servicing fluid composition of claim 1, wherein the continuous phase may also comprise one or more of alkalis, salts, surfactants, organic polymers, droplets of emulsified oil, biocides, corrosion inhibitors and various insoluble substances.

5. A process for producing an oilfield servicing fluid composition comprising the steps of:
    a) obtaining a guar containing a galactose;
    b) hydrating the guar containing a galactose;
    c) contacting and reacting the guar containing a galactose with galactose oxidase to produce an aldehyde guar;
    d) combining the aldehyde guar with a continuous phase to produce a oilfield servicing fluid,
wherein the continuous phase comprises water and a salt, wherein the salt is selected from the group consisting of potassium chloride, sodium chloride, calcium chloride, potassium formate, potassium carbonate, calcium bromide, tetramethyl ammonium chloride, and any mixture thereof, and wherein the guar containing a galactose is a guar derivative selected from the group consisting of hydroxypropyl guar (HPG), carboxymethyl guar (CMG), carboxymethyl hydroxypropyl guar (CMHPG), hydroxyethyl guar (HEG), carboxymethyl guar (CMHEG), hydrophobically-modified guar (HMG), hydrophobically-modified carboxymethyl guar (HMCMG) and hydrophobically-modified hydroxyethyl guar (HMHEG).

6. The process for producing an oilfield servicing fluid composition of claim 5, wherein the galacose oxidase is combined with an amount of catalase.

7. The process for producing an oilfield servicing fluid composition of claim 6, wherein the galacose oxidase is further combined with an amount of peroxidase.

8. The process for producing an oilfield servicing fluid composition of claim 5, wherein step c) is performed while the guar containing a galactose is in a solid, slurry, or solution form.

9. The process for producing an oilfield servicing fluid composition of claim 8, wherein step c) is performed while the guar containing a galactose is in a solid form.

10. The process for producing an oilfield servicing fluid composition of claim 9, wherein the solid form is a particulate selected from the group consisting of splits, flaked splits and flour.

11. The process for producing an oilfield servicing fluid composition of claim 10, wherein the guar containing a galactose is contacted with a solution of galactose oxidase.

12. The process for producing an oilfield servicing fluid composition of claim 11, wherein the solution of galactose oxidase is sprayed onto the guar containing a galactose.

13. The process for producing an oilfield servicing fluid composition of claim 9, wherein the galactose oxidase is dry blended with the guar containing a galactose.

\* \* \* \* \*